United States Patent [19]

Allemand et al.

[11] Patent Number: 4,461,953

[45] Date of Patent: Jul. 24, 1984

[54] X-RAY DETECTOR FOR DETECTING X-RAYS HAVING PASSED THROUGH AN OBJECT OR ORGAN

[75] Inventors: Robert Allemand, Saint Ismier; Jean-Jacques Gagelin, Vinay; Edmond Tournier, Grenoble, all of France

[73] Assignee: Commissariat a l'Energie Atomique, Paris, France

[21] Appl. No.: 363,616

[22] Filed: Mar. 30, 1982

[30] Foreign Application Priority Data

Apr. 15, 1981 [FR] France ............................... 81 07567

[51] Int. Cl.[3] ............................................. G01T 1/18

[52] U.S. Cl. ................................................ 250/374

[58] Field of Search ................. 250/374, 379; 324/465

[56] References Cited

U.S. PATENT DOCUMENTS 2,936,388 5/1960 Chubb et al. ........................ 250/374

3,126,479 3/1964 Mattson .............................. 250/374

4,047,041 9/1977 Houston .

FOREIGN PATENT DOCUMENTS 2314699 1/1977 France .

OTHER PUBLICATIONS

Hickam et al., "Electron Attachment in $SF_6$ Using Monoenergetic Electrons", *Jour. of Chem. Physics,* vol. 25, No. 4, Oct. 1956, pp. 642-647.

Lakshminarasimha et al., "Time-of-Flight Electron-Swarm of Ionization and Attachment in Gases," *Proc. of IEE,* vol. 122, No. 10, pp. 1162-1165, Oct. 1975.

*Primary Examiner*—Janice A. Howell

*Attorney, Agent, or Firm*—Pearne, Gordon, Sessions, McCoy, Granger & Tilberry

[57] ABSTRACT

The present invention relates to a detector of X-rays having passed through an object or an organ. This detector comprises at least one tight ionization chamber containing a gas ionizable by the rays issuing from the object and, in this chamber, a plate for collecting the charges and a series of electrodes for collecting the charges resulting from the ionization of the gas. The ionization chamber further contains a gas capable of creating, within the mixture thus formed, a movement of gas opposite the movement of the ions.

5 Claims, 2 Drawing Figures

X-RAY DETECTOR FOR DETECTING X-RAYS HAVING PASSED THROUGH AN OBJECT OR ORGAN

The present invention relates to an X-ray detector and particularly one for detecting X-rays which have passed through an object and/or an organ, which were furnished by a specific source emitting in the direction of the object or organ a plane beam of incident X-rays having a wide angular aperture and of small thickness. This invention is more particularly applicable to the tomography of organs, but also to industrial checking, such as the checking of luggage, for example.

These X-ray detectors make it possible to measure the absorption of a beam of X-rays passing through an object or an organ, this absorption being associated with the density of the tissues of the organ examined or the density of the materials constituting the object studied.

If it is desired to draw up the density chart of an organ or an object, it is possible, and known, to send a plane beam of incident X-rays onto this object or organ, said beam having a wide angular aperture and being of small thickness, and to observe the corresponding absorption for each position of the beams of incident X-rays with respect to the object or organ. A multiplicity of scannings in crossing directions makes it possible to know, due to the X-ray detector, after an appropriate digital processing of the signals collected on the cells of the detector, the value of the absorption of the X-rays at one point of the plane of section considered, and thus to know the density of the tissues of the organ or the density of the materials constituting the object.

Most of the X-ray detectors employing ionization and used in tomography are of multicellular type and comprise cells defined by conducting plates perpendicular to the plane of the beam of X-rays and taken alternately to positive and negative potentials. These cells are located in a tight enclosure containing an ionizable gas. The advantages of this type of multicellular detector are as follows: they allow a good collimation of the X-rays when the plates used in the detection cells are constituted by a very absorbent material; the time for collection of the charges resulting from ionization of the gas by the X-rays is very short due to the small spacing of the conducting plates and the good separation between the detection cells. However, this type of detector presents considerable drawbacks: it is possible to reduce the thickness of the plates in order to increase the quantity of X-rays detected, but this is to the detriment of collimation due to the small thickness of the plates: this small thickness of the plates further provokes a considerable microphony. Finally, the detectors of this type are highly complex to produce, this leading to high manufacturing costs, and they necessitate assembly in a dedusted room, since any dust on one of the plates may start off or deteriorate the leakage current between two consecutive plates. Added to these drawbacks is the fact that the numerous plates used require numerous electrical connections inside the tight chamber, which raises difficult problems of reliability of the welds of the connections on the plates.

Another type of detector is known which has a much simpler structure, but which is not perfect. This other type of detector comprises a tight chamber containing a gas ionizable by rays issuing from the organ or the object and, in this chamber, a plate for collecting the electrons resulting from ionization of the gas; this plate is parallel to the plane of the beam of incident rays and it is taken to a positive high voltage. A series of electrodes for collecting the ions resulting from ionization of the gas by the X-rays issuing from the object, is disposed parallel and opposite the preceding plate; these ion collecting electrodes are taken to a potential close to 0 and are directed towards the source which emits the X-rays in the direction of the object. They are located in a plane parallel to the plane of the beam of the incident rays and furnish respectively a measuring current proportional to the quantity of ions obtained by ionization of the gas opposite each electrode, under the effect of the rays issuing from the object or the organ, in a direction corresponding to that of the incident rays.

This type of detector presents certain advantages: there are no longer any separation plates, as in the detector mentioned hereinbefore; this elliminates any undesirable phenomenon of microphony. Due to the elimination of these separation plates, the quantity of X-rays detected is maximum; this type of detector is very simple to produce and it is hardly sensitive to dust.

The gas contained in the ionization chamber of this detector is generally a gas such as xenon; this gas may be supplemented by other gases to improve detection.

This type of detector presents a serious drawback in that, upon considerable irradiation, the positive ions such as $Xe^{+}$ ions, of which the number is high, migrate towards the most negative electrode. These ions take along the atoms of gas, which provoke inside the detector movements of gas bringing about local excess pressures and depressions, disturbing the sensitivity of detection at the places affected. Moreover, these disturbances are not at fixed spots in the detector, but move therein, this further disturbing the measurements of currents circulating in the electrodes.

It is an object of the invention to remedy these drawbacks and in particular to provide an X-ray detector which presents the structure which has just been described, but which makes it possible, due to an additional gas, to reduce the disturbances of the sensitivity of the detector by attenuating the excess pressures and depressions appearing therein upon considerable irradiation.

The invention relates to an X-ray detector adapted for example to detect rays having passed through an object or an organ and being furnished by a source emitting towards the object a plane beam of incident X-rays, this beam having a wide angular aperture and being of small thickness, said detector comprising at least one tight ionization chamber containing at least one gas ionizable by the rays issuing from the object, and, in this chamber, a plate for collecting the charges resulting from ionization of the gas, this plate being parallel to the plane of the beam of incident rays and being taken to a first potential and a series of electrodes for collecting the charges resulting from ionization of the gas, these charge collecting electrodes being taken to a second potential and being directed towards the source, in a plane parallel to the plane of the beam of incident rays opposite the charge collecting plate, these charge collecting electrodes furnishing a current resulting from the ionization of the gas opposite each of the electrodes under the effect of the X-rays, characterised in that the ionization chamber further contains an electronegative gas.

According to a further feature, the electronegative gas is sulfur hexafluoride.

According to another feature, this electronegative gas may be oxygen or nitrogen.

Finally, according to another feature, the ionizable gas is xenon or another neutral gas.

The invention will be more readily understood on reading the following description with reference to the accompanying drawings, in which.

Figure 1:
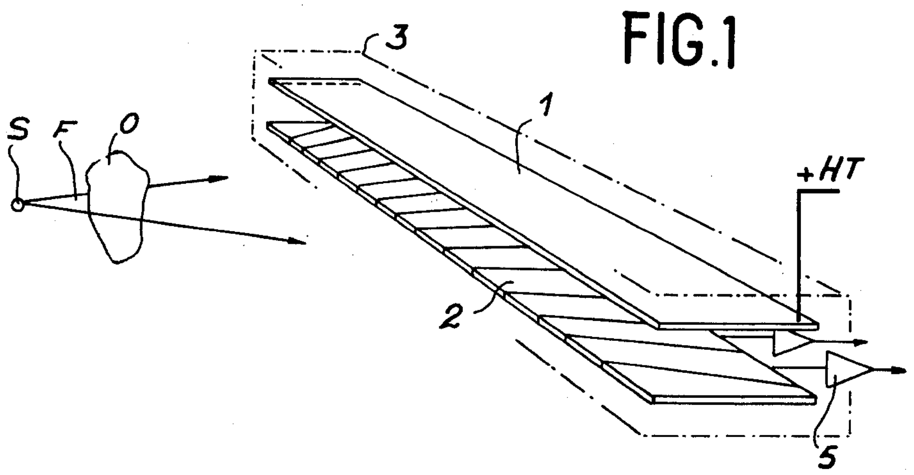
FIG. 1 is a schematic view in perspective of the detector according to the invention.

Referring now to the drawings, FIG. 1 schematically shows, in perspective, a detector according to the invention which comprises a plate 1 taken to a positive high voltage +HT and, opposite, a series of electrodes 2 taken to a potential close to 0 volt. This plate and these electrodes are located in a tight main chamber 3, shown schematically, which contains at least one ionizable gas such as xenon for example, to which an electronegative gas such as sulfur hexafluoride $SF_6$, oxygen or nitrogen has been added. This detector detects the X-rays which have passed through an object or an organ O, these rays being furnished by a source S which emits towards the object or the organ a plane beam F of incident X-rays; this beam has a wide angular aperture and is of small thickness. The plate 1 is parallel to the plane of the beam of incident rays, whilst the plane electrodes 2 are located in a plane parallel to the plane of the beam of incident rays, opposite the plate 1. The plate 1 which is taken to a positive potential of some kilovolts, is a plate for collecting negative charges, particularly the negative $SF_6^-$ ions. The electrodes 2 are electrodes for collecting the positive ions obtained by ionization of the gas contained in the detector. In the example described, these positive ions are $Xe^+$ ions. The electrodes are generally borne by an insulating plate (not shown in this figure) and are electrically insulated from one another. They may be obtained by deposit of copper on an insulating support. The pressure of the xenon inside the tight chamber has a value of between 5 and 30 bars; this gas may, furthermore, be supplemented by other gases intended to improve detection. The electrodes 2 form bands converging in the direction of the source S. The currents which circulate in the electrodes 2, currents induced by the displacement of the charges, are amplified by amplifiers 5, before being processed by a system (not shown) for displaying a section of the organ or the object studied. The negative ions ($SF_6^-$ for example in the example in question) are picked up by plate 1.

Figure 2:
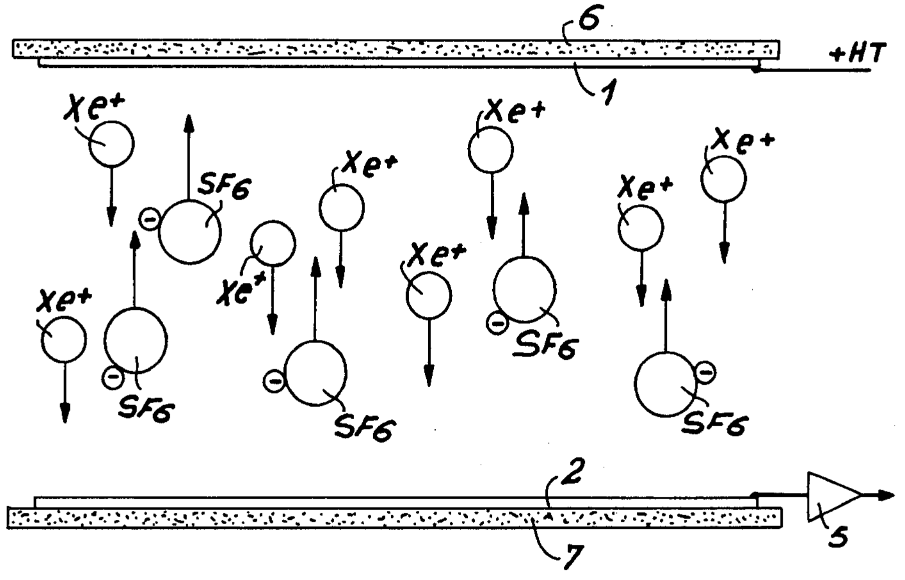
FIG. 2 is a side view of the detector of the invention showing the functioning thereof more clearly.

FIG. 2 schematically shows a side view of the detector of the invention. This figure shows the plate 1 taken to a positive high voltage +HT; this plate is assumed to be fixed to an insulating support 6 and the tight chamber 3 has not been shown in this figure. This figure also shows one of the electrodes 2 borne by an insulating plate 7; this electrode is connected to one of the amplifiers 5 mentioned hereinabove. In the embodiment of the detector of the invention described by way of example, it is assumed that the detection gas is xenon and that the electronegative gas is sulfur hexafluoride; further to the ionization of the detection gas by the X-rays coming from the object or the organ O, the electrode 2 receives positive ions $Xe^+$, whilst the released electrons are taken towards the positive plate 1 by the electronegative gas (for example sulfur hexafluoride $SF_6$). As has been indicated above, this mixture of at least one detection gas and an electronegative gas makes it possible, upon considerable irradiation which creates a very large number of positive ions ($Xe^+$ in the example in question), to avoid movements of gas which bring about local excess pressures and depressions disturbing the sensitivity of detection. The electronegative gas introduced into the detector according to the invention enables the free electrons coming from ionization of the gas to be trapped; this results in a movement of negative ions in the direction opposite that of the positive ions which reduces the amount of the disturbances. The electronegative gas is preferably an inert gas such as sulfur hexafluoride in order to avoid any corrosion in the detector; however, it is possible to use a non-inert gas such as oxygen for example, provided that electrodes and a plate made of gold, or electrodes and a plate made of copper coated with a leaf of gold, are used.

It is obvious that, in the detector which has just been described, the means used could have been replaced by equivalent means, without departing from the scope of the invention. In particular, any gas capable of causing within the detector mixture a movement of gas opposite that of the ions produced by X-ray radiation enables the invention to be carried out.

What is claimed is:

1. In an X-ray detector, adapted for example to detect the rays having passed through an object or an organ, furnished by a source emitting towards the object a plane beam of incident X-rays, said beam having a wide angular aperture and being of small thickness, said detector comprising at least one tight ionization chamber containing at least one gas ionizable by the rays issuing from the object and, in this chamber, a plate for collecting the charges resulting from ionization of the gas, this plate being parallel to the plane of the beam of incident rays and being taken to a first potential, and a series of electrodes for collecting the charges resulting from ionization of the gas, these charge collecting electrodes being taken to a second potential and being directed towards the source, in a plane parallel to the plane of the beam of incident rays, opposite the electron collecting plate, there charge collecting electrodes furnishing a current resulting from ionization of the detector gas opposite each of the electrodes under the effect of the X-rays, the ionization chamber further contains a gas capable of creating, in the mixture thus formed, a movement of gas opposite the movement of the ions, the electrodes being formed by conducting bands deposited on an insulating support, these bands converging in the direction of the source and being electrically insulated from one another.

2. The detector of claim 1, wherein said gas is electronegative.

3. The detector of claim 2, wherein the electronegative gas is sulfur hexafluoride.

4. The detector of claim 1, wherein the electronegative gas is oxygen or nitrogen.

5. The detector of any one of claims 1 to 4, wherein the ionizable gas is xenon.

* * * * *

UNITED STATES PATENT AND TRADEMARK OFFICE
CERTIFICATE OF CORRECTION

PATENT NO. : 4,461,953

DATED : July 24, 1984

INVENTOR(S) : Robert Allemand, Jean-Jacques Gagelin, Edmond Tournier

It is certified that error appears in the above-identified patent and that said Letters Patent are hereby corrected as shown below:

IN THE CLAIMS

Claim 1, Column 4, line 46, "there" should read "these".

Signed and Sealed this

*Twentieth* Day of *November 1984*

[SEAL]

*Attest:*

GERALD J. MOSSINGHOFF

*Attesting Officer* *Commissioner of Patents and Trademarks*